United States Patent
Ishii et al.

(10) Patent No.: US 8,879,199 B2
(45) Date of Patent: Nov. 4, 2014

(54) LOCKING MECHANISM AND LIBRARY APPARATUS

(71) Applicant: NEC Corporation, Tokyo (JP)

(72) Inventors: Hiroaki Ishii, Tokyo (JP); Hidehiro Urahama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/098,751

(22) Filed: Dec. 6, 2013

(65) Prior Publication Data

US 2014/0160912 A1    Jun. 12, 2014

(30) Foreign Application Priority Data

Dec. 6, 2012    (JP) ................................ 2012-267403

(51) Int. Cl.
   *G11B 17/08*    (2006.01)
   *G11B 5/016*    (2006.01)
   *G11B 33/00*    (2006.01)

(52) U.S. Cl.
   CPC .................................... *G11B 33/005* (2013.01)
   USPC .................................... 360/98.04; 360/99.02

(58) Field of Classification Search
   CPC ....................................................... G11B 17/10
   USPC ........ 360/92.1, 98.04–98.06, 99.02; 242/337, 242/337.1; 369/30.4, 30.41–30.49; 720/632, 633

See application file for complete search history.

(56) References Cited

U.S. PATENT DOCUMENTS 6,262,959 B1 *    7/2001    Hashimoto ................... 720/632

FOREIGN PATENT DOCUMENTS

| JP | 2009-230839 A | 10/2009 |
| JP | 2011-165239 A | 8/2011 |

* cited by examiner

*Primary Examiner* — Joseph Feild
*Assistant Examiner* — Gustavo Polo
(74) *Attorney, Agent, or Firm* — Sughrue Mion, PLLC (57) ABSTRACT

Disclosed is a locking mechanism which can perform the reduction of non-actual working hours of the library apparatus. The locking mechanism includes a first locking unit which fits with a cutout provided on a side surface of an object to be locked, the object being formed with a plurality of surfaces and the side surface being one of the surfaces in a insertion/extraction direction of the object; and a second locking unit, provided on an opposite side of the first locking unit in a manner sandwiching the object, which includes a contact member which is in contact with a back surface of the object, the back surface being one of the surfaces and far from a slot to/from which the object is inserted/extracted, wherein at least a part of the contact member is located in a path of the object.

17 Claims, 8 Drawing Sheets

LOCKING MECHANISM AND LIBRARY APPARATUS

This application is based upon and claims the benefit of priority from Japanese Patent Application No. 2012-267403, filed on Dec. 6, 2012, the disclosure of which is incorporated herein in its entirety by reference.

TECHNICAL FIELD

The present invention relates to a library apparatus which stores a plurality of recording media and performs reads/writes data from/to the recording medium. The present invention also relates to a locking mechanism which is provided in the library apparatus.

BACKGROUND ART

In order to store a program and data used in a computer with a high reliability, a library apparatus such as a magnetic tape library apparatus is used.

In a magnetic tape library apparatus, a cartridge made by uniting a magnetic tape which is the recording medium and a reel is used in an replaceable manner. The library apparatus includes a cartridge storage shelf (in the following description, it is referred to as "magazine") which stores a plurality of such cartridges, a drive apparatus that performs reads/writes from/to the recording medium and an accessor mechanism which conveys the recording medium between the magazine and the drive apparatus.

The interior of the magazine is divided into a plurality of cells, and one cartridge is stored in each cell.

The accessor mechanism carries out an operation to take out the cartridge stored in any cell of any magazine and set the cartridge to the drive apparatus. The accessor mechanism also carries out an operation to take out the cartridge from the drive apparatus and store the cartridge into the any cell of the any magazine.

In such library apparatus, the cartridge is replaced as follows. That is, a user draws out the magazine and takes it out to outside of the apparatus. Then, the user replaces the cartridge and inserts the magazine in which the replaced cartridge is stored into the apparatus.

After the cartridge is replaced, the library apparatus needs to carry out an inventory processing. That is, the library apparatus is necessary to perform the inventory processing to acquire information on all the stored cartridges by, for example, reading an identifier of the cartridge from a barcode provided on the cartridge, and to store the acquired information in a memory unit in the library apparatus.

However, along with increase of the volume of data stored in recording media, a large number of recording media have come to be high-densely mounted, and, as a result, there are problems that an execution time of inventory processing is increased and non-actual working hours of the library apparatus is increased.

For example, Japanese Patent Application Laid-Open No. 2011-165239 discloses a technology which realizes reduction of non-actual working hours in the library apparatus when replacing the cartridge. Specifically, a mechanism which enables a part of shelf of the magazine to eject out of the library apparatus and enables to replace the cartridge while continuing an operation of the library apparatus is disclosed.

Japanese Patent Application Laid-Open No. 2009-230839 discloses a magazine holding structure which can change a drawing amount of the magazine step by step with the simple mechanism that has a fewer components.

In the library apparatus disclosed in the above-mentioned Japanese Patent Application Laid-Open No. 2011-165239, the number of cartridges that can be taken out at once is small, such as one or two cartridges. Accordingly, because the library apparatus requires large number of times of cartridge replacement, there is a problem that the non-actual working hours is still long.

Japanese Patent Application Laid-Open No. 2009-230839 discloses the technology to change the drawing amount of the magazine step by step in the library apparatus, and the technology to realize reduction of non-actual working hours of the library apparatus is not disclosed.

SUMMARY

The present invention has been made in view of the above-mentioned problems, and its main purpose is to provide a library apparatus and the like which realize reduction of non-actual working hours.

A locking mechanism according to an exemplary aspect of the invention includes: a first locking unit which fits with a cutout provided on a side surface of an object to be locked, the object being formed with a plurality of surfaces and the side surface being one of the surfaces in a insertion/extraction direction of the object; and a second locking unit, provided on an opposite side of the first locking unit in a manner sandwiching the object, which includes a contact member being contact with a back surface of the object, the back surface being one of the surfaces and far from a slot to/from which the object is inserted/extracted, wherein at least a part of the contact member being located in a path of the object.

A library apparatus according to an exemplary aspect of the invention includes: a first object placed in a near side from a slot to/from which the first object is inserted/extracted; a second object placed in a back side from the slot relative to the first object; and a locking mechanism having a first locking unit which fits with a cutout provided on an outer surface parallel to an insertion/extraction direction of the first object, the first object being formed with a plurality of outer surfaces, and a second locking unit, provided on an opposite side of the first locking unit in a manner sandwiching the first object, which includes a contact member being contacted with a projection provided on a back surface of the first object, wherein the contact member being located not in the path of the first object.

According to the present invention, an effect that reduction of non-actual working hours of the library apparatus can be realized is obtained.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, an exemplary embodiment of the present invention will be described in detail with reference to drawings.

First Exemplary Embodiment

Figure 1:
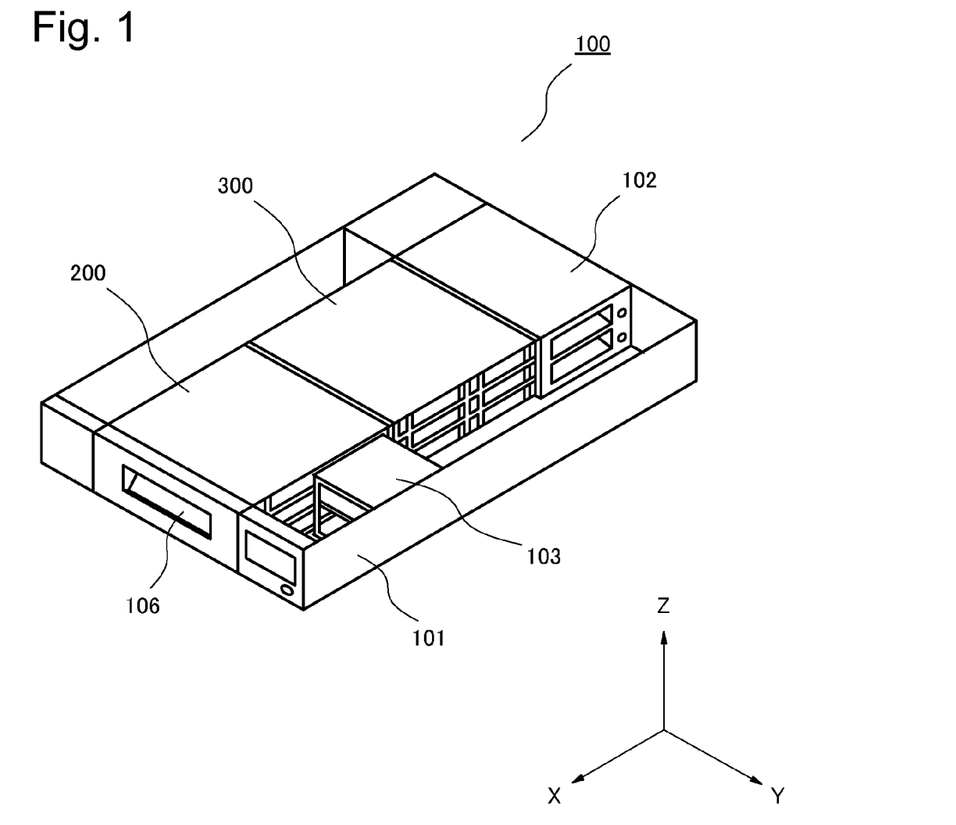
FIG. 1 is a perspective view of a library apparatus according to a first exemplary embodiment of the present invention.

FIG. 1 is a perspective view of a library apparatus 100 according to the first exemplary embodiment of the present invention. In this exemplary embodiment, the magnetic tape housed in the cartridge is used as the recording medium.

As shown in FIG. 1, the library apparatus 100 includes a front magazine 200 and a rear magazine 300 at the front side and the rear side of a chassis 101 when seen from a slot 106. The front magazine 200 and the rear magazine 300 are cartridge storage shelves which store magnetic tapes. Each of the magnetic tapes is housed in the cartridge. Each of the front magazine 200 and the rear magazine 300 is formed with a plurality of outer surfaces. In the following description, it is supposed that the library apparatus 100 is arranged in a three dimensional space (X-Y-Z coordinate space) as shown in FIG. 1.

The library apparatus 100 also includes an accessor mechanism 103 which conveys the cartridge in the front magazine 200 and the rear magazine 300, and a magnetic tape drive 102 which performs read/write of data from/to the magnetic tape in the conveyed cartridge. The front magazine 200 and the rear magazine 300 can be moved and inserted/extracted to/from the slot 106 in the insertion/extraction direction (X-direction) by a user. Meanwhile, although the library apparatus 100 has a top plate which covers the upper part of the chassis 101, description about it will be omitted below in order to focus on description of constructional elements.

Figure 2:
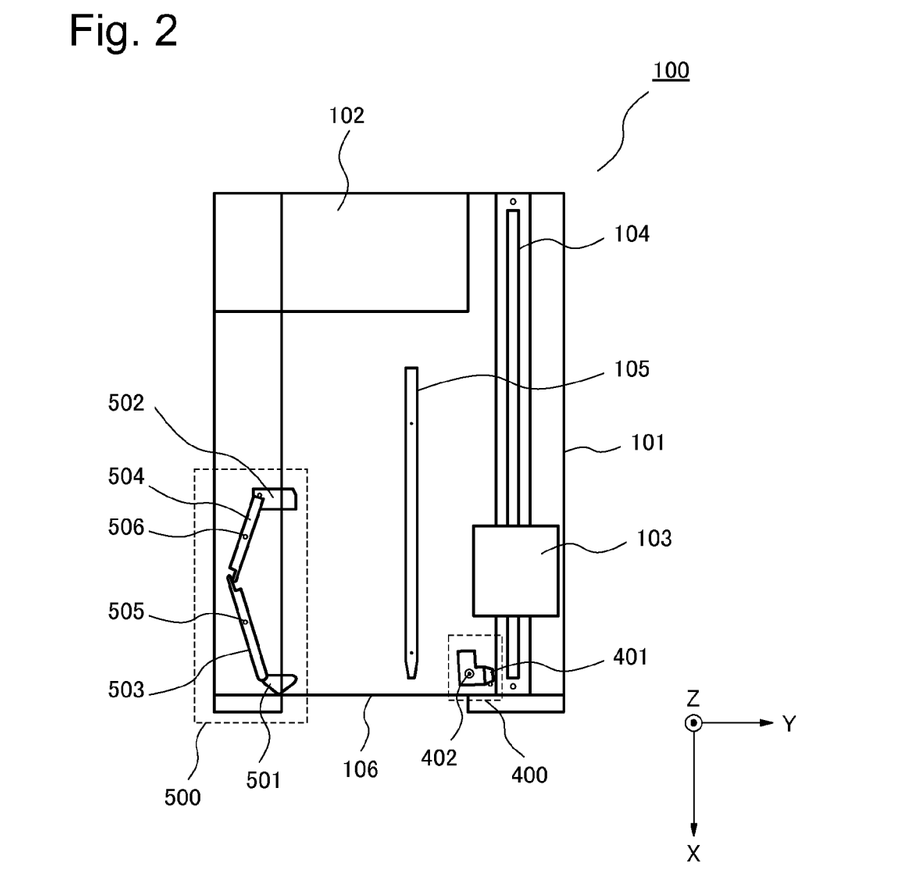
FIG. 2 is a top view of the library apparatus in a state that a front magazine and a rear magazine are removed according to the first exemplary embodiment of the present invention.

FIG. 2 is a top view showing the library apparatus 100 in a state that the front magazine 200 and the rear magazine 300 are removed according to this exemplary embodiment shown in FIG. 1. As shown in FIG. 2, the library apparatus 100 includes a first locking mechanism 400 and a second locking mechanism 500. The library apparatus 100 also includes an accessor mechanism guide rail 104 and a magazine guide rail 105. The accessor mechanism 103 can be moved in the X-direction along the accessor mechanism guide rail 104. The front magazine 200 and the rear magazine 300 can be moved in the X-direction along the magazine guide rail 105.

The first locking mechanism 400 includes a locking lever 401, a locking rotational axis(axle) 402 arranged in the Z-direction and a biasing spring which is not illustrated. The locking lever 401 can rotate (rotatable) about the locking rotational axis 402, and stops at the angle shown in FIG. 2 by the biasing spring unless an external force is added.

The second locking mechanism 500 includes a locking block 501 which is a locking member, a locking block 502 which is a contact member, a locking shaft 503 which is a second shaft and a locking shaft 504 which is a first shaft. The second locking mechanism 500 also includes a locking rotational axis 505 and a locking rotational axis 506 arranged in the Z-direction respectively.

As shown in FIG. 2, the locking block 501 has an upper surface of an approximate inverted triangle shape, and the locking block 502 has an upper surface of an approximate rectangle shape, for example. The locking block 501 is connected with an end of the locking shaft 503 which can rotate about the locking rotational axis 505. The locking block 502 is connected with an end of the locking shaft 504 which can rotate about the locking rotational axis 506.

The other end of the locking shaft 503 and the other end of the locking shaft 504 have projected pieces, respectively, and the second locking mechanism 500 has a configuration in which the projected pieces are in contact with each other. The second locking mechanism 500 also have a biasing spring (not illustrated) which connects the locking shaft 503 and the locking shaft 504 near the contact site of both the projected pieces. By a biasing force by the biasing spring, the second locking mechanism 500 stops at the angle shown in FIG. 2.

In the second locking mechanism 500, a move of the locking block 501 in the Y-direction shown in FIG. 2 and a move of the locking block 502 in the Y-direction are in conjunction with each other by a conjunction mechanism. The conjunction mechanism is composed of the locking shafts 503 and 504, the locking rotational axes 505 and 506 and a biasing spring. The conjunction mechanism accomplishes the following operation. That is, when the locking block 502 moves in the Y-direction, the locking shaft 504 rotates about the locking rotational axis 506. According to the rotation, the projected piece of the locking shaft 503 contacted with the projected piece of the locking shaft 504 is pushed up, and the locking shaft 503 rotates about the locking rotational axis 505. The locking block 501 moves in the Y-direction along with the rotation of the locking shaft 503.

Next, an arrangement in the usual operating of the library apparatus 100 will be described.

Figure 3:
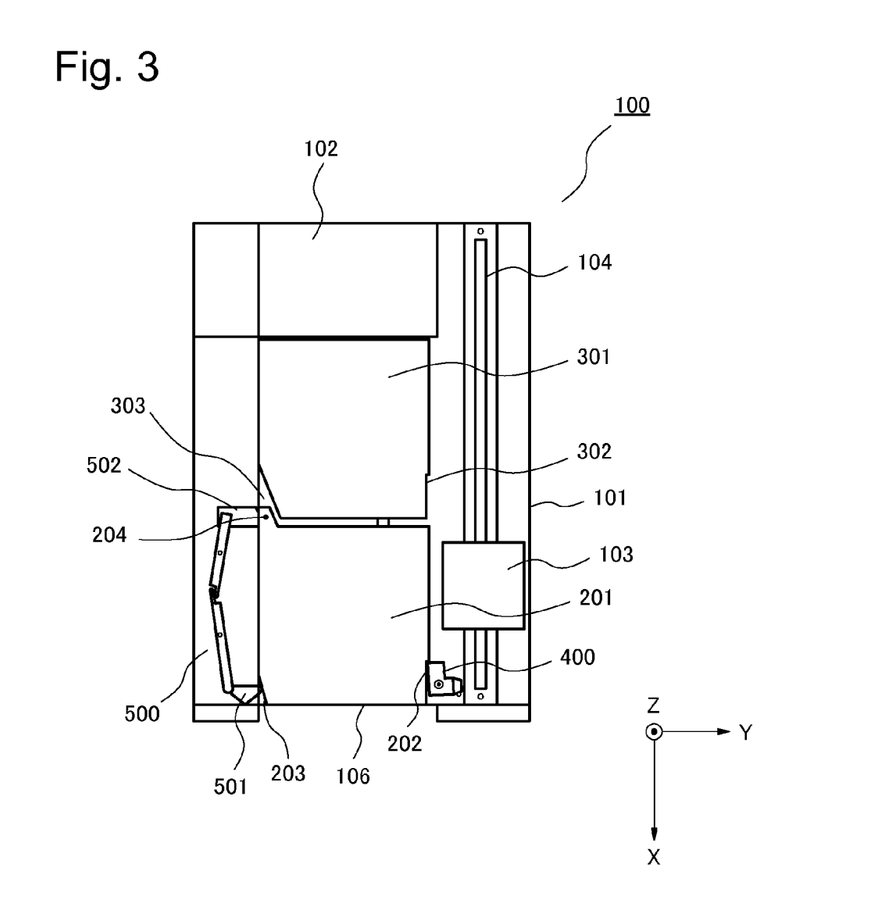
FIG. 3 is a top view of the library apparatus in a state that the front magazine and the rear magazine are housed according to the first exemplary embodiment of the present invention.

FIG. 3 is a top view showing an arrangement of the library apparatus 100 in the usual operating according to this exemplary embodiment. FIG. 3 indicates a state that the front magazine 200 and the rear magazine 300 are stored in the library apparatus 100 shown in FIG. 2. In FIG. 3, about the front magazine 200 and the rear magazine 300, only a front magazine bottom plate 201 and a rear magazine bottom plate 301 of which the respective bottom surfaces are composed are indicated for convenience of explanation.

As shown in FIG. 3, the front magazine bottom plate 201 includes a cutout (cutout part) 202, a concave (concave part) 203 and a projection (projecting part) 204. The rear magazine bottom plate 301 includes a cutout (cutout part) 302 and a concave 303. The concave 203 and the concave 303 have shapes shown in FIG. 3 respectively, and the concave 303 has a shape into which the projection 204 can be inserted as shown in FIG. 3. The concave 203 is provided on the opposite side surface of the side surface on which the cutout 202 is provided.

The front magazine bottom plate 201 and the rear magazine bottom plate 301 are connected by a fitting member, which is not illustrated, in a manner in which they can be released from each other.

The library apparatus 100 carries out an usual operation in the arrangement shown in FIG. 3. The first locking mechanism 400 can apply rotational biasing force toward the front magazine bottom plate 201, and be fitted with the cutout 202 provided on a side surface of the front magazine bottom plate 201. In the usual operating, the first locking mechanism 400 is arranged in the state that it is fitted with the cutout 202. The first locking mechanism 400 prevents the front magazine 200 and the rear magazine 300 from being drawn out from the slot 106 of the chassis 101 by this fitting.

The second locking mechanism 500 stops in the state that the locking block 501 is located at the concave 203 of the front magazine bottom plate 201 as shown in FIG. 3, and in the state that the locking block 502 is in contact with the projection 204 of the front magazine bottom plate 201. At that time, the front magazine bottom plate 201 is in the state that it pushes the locking blocks 501 and 502, and the locking blocks 501 and 502 apply biasing force in the direction of the front magazine bottom plate 201 by the biasing spring.

In the state shown in FIG. 3, the accessor mechanism 103 performs extraction, transportation and storage operations of the cartridge stored in the front magazine 200 and the rear magazine 300 based on control by a control circuit which is not illustrated. The accessor mechanism 103 also performs, in the magnetic tape drive 102, read/write data from/to the magnetic tape housed in the cartridge. The position of the first locking mechanism 400 and the second locking mechanism 500 in the usual operating shown in FIG. 3 is called an "initial position" in the following description.

Next, an arrangement of the library apparatus 100 when replacing the cartridges will be described.

Figure 4:
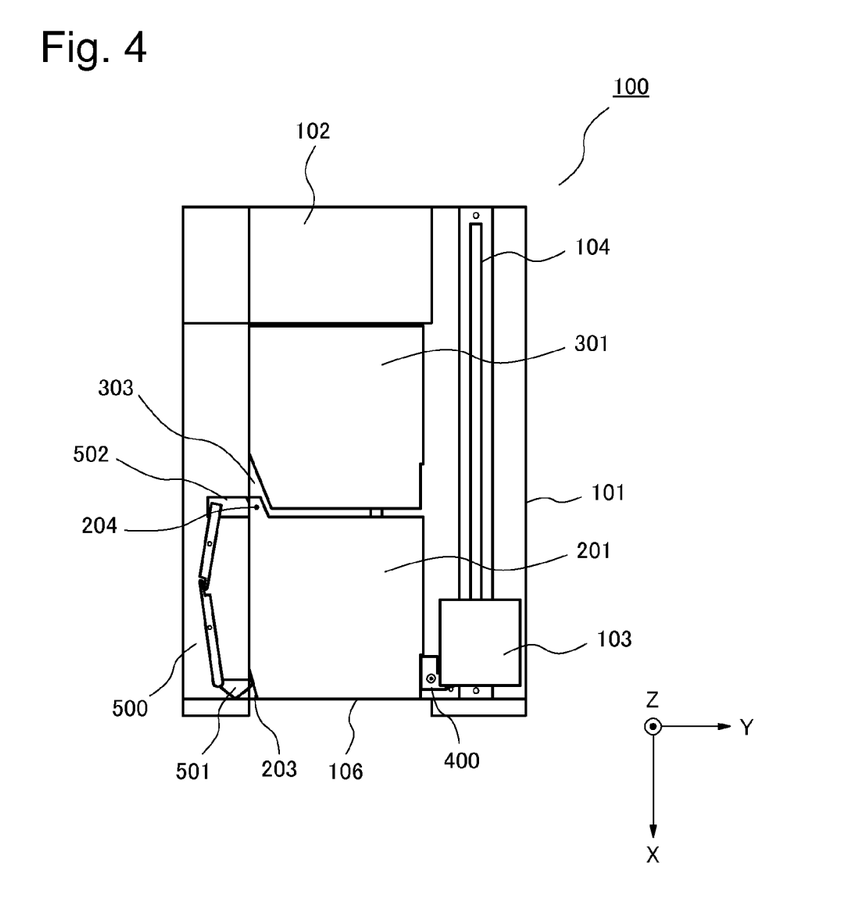
FIG. 4 is a top view of the library apparatus in a state that the cartridge replacement is started according to the first exemplary embodiment of the present invention.

FIG. 4 is a top view showing the library apparatus 100 according to this first exemplary embodiment in the state when the replacement of the cartridges is begun. An arrangement of the library apparatus 100 when replacing the cartridges will be described with reference to FIG. 4.

When replacing the cartridges, the control circuit notifies the accessor mechanism 103 that the replacement of the cartridge is carried out. The accessor mechanism 103 moves to the position shown in FIG. 4 according to the above notification, and pushes the locking lever 401 of the first locking mechanism 400. When the locking lever 401 is pushed, the first locking mechanism 400 releases its fitting with the front magazine bottom plate 201 by rotating about the locking rotational axis 402. As a result, the front magazine 200 and the rear magazine 300 get movable in the X-direction shown in FIG. 4.

When the fitting is released as mentioned above, the user takes out the front magazine 200 from the slot 106 for replacing the cartridges. When the user draws out the front magazine 200 in the X-direction, the rear magazine 300 is also drawn toward the slot 106 because the front magazine 200 and the rear magazine 300 are connected with each other by the fitting member. Here, when the front magazine 200 is drawn out, the accessor mechanism 103 goes backward, that is, (−X) direction because of a vibration or the like of the drawing of the front magazine 200. As a result, the pushing the locking lever 401 by the accessor mechanism 103 is released. Therefore, the first locking mechanism 400 applies the force to return to the initial position by the force of the biasing spring to the side surface of the front magazine bottom plate 201 while the front magazine 200 is being taken out.

In addition, when the front magazine 200 is drawn out, the locking block 502 of the second locking mechanism 500 moves in the Y-direction because the projection 204 with which the locking block 502 has been in contact does not exist any more at the original position before the drawing. In connection with that, the front magazine bottom plate 201 pushes the locking block 501 because the force in the Y-direction is applied to the locking block 501. The front magazine 200 is drawn out from the chassis 101 with maintaining this state.

Next, an arrangement when the front magazine 200 is drawn out completely from the chassis 101 will be described.

Figure 5:
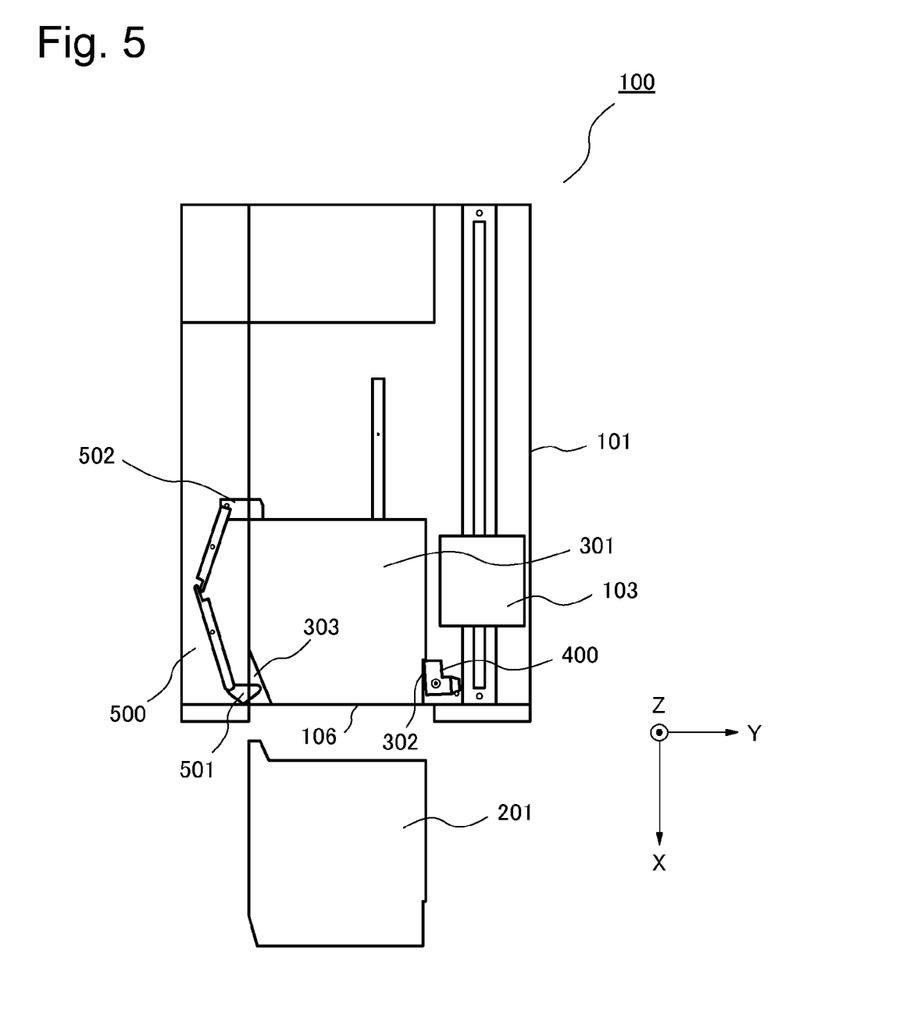
FIG. 5 is a top view of the library apparatus in a state that the front magazine is drawn out from a slot of the chassis according to the first exemplary embodiment of the present invention.

FIG. 5 is a top view showing the library apparatus 100 according to this first exemplary embodiment in the state that the front magazine 200 has been drawn out from the slot 106 of the chassis 101. As shown in FIG. 5, when the front magazine 200 has been drawn out, the first locking mechanism 400 that has applied the force to return to the initial position to the side face of the front magazine bottom plate 201 is fitted with the cutout 302 of the rear magazine bottom plate 301. By this fitting, the move of the rear magazine 300 in the (+X) direction is restricted. Along with this, the connection of the front magazine 200 and the rear magazine 300 by the fitting member is released, and only the front magazine 200 is taken out from the chassis 101.

When the front magazine 200 has been taken out from the chassis 101, the front magazine bottom plate 201 that has pushed the locking block 501 disappears from the original position before the extraction. Therefore, the second locking mechanism 500 returns to the initial position shown in FIG. 5 by the biasing spring. That is, the locking block 501 is in the position where it does not overlap with the path of the front magazine bottom plate 201 during the front magazine 200 being taken out from the chassis 101 because the front magazine bottom plate 201 pushes the locking block 501. Then, the locking block 501 moves to the position where at least a part of it is located in the path of front magazine bottom plate 201 in the manner the locking block 501 may project to the concave 303 when the front magazine 200 is completely taken out. The locking block 501 stops at the initial position shown in FIG. 5. At that time, also the locking block 502 projects into the path of the front magazine bottom plate 201 in connection with the move of the locking block 501, and contacts with the rear of the rear magazine bottom plate 301. By the locking block 502 being in contact with the rear of the rear magazine bottom plate 301, the move of the rear magazine 300 in the (−X) direction is restricted.

Thus, by fitting by the first locking mechanism 400 and locking by the second locking mechanism 500, the rear magazine 300 will be in the state that it can move in neither the (+X) direction nor the (−X) direction. In this state, the user carries out the replacement of the cartridges in the front magazine 200 taken out as mentioned above.

Figure 6:
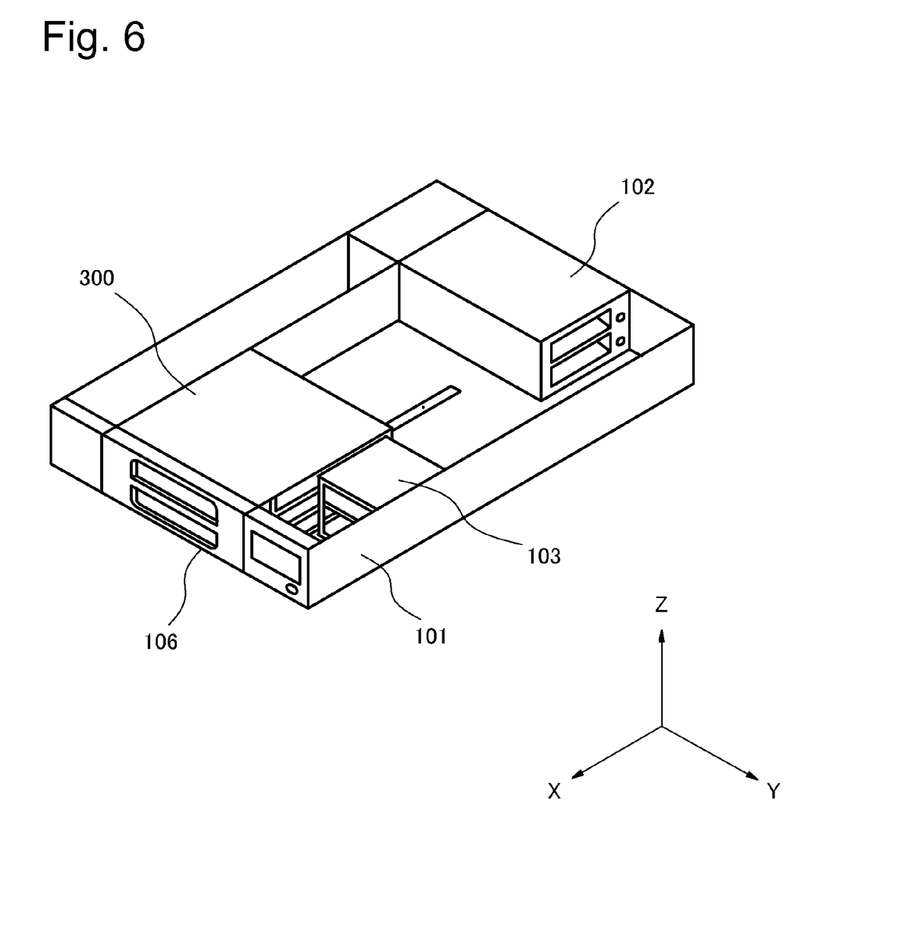
FIG. 6 is a perspective view of the library apparatus in a state that the rear magazine is locked at front side of the chassis according to the first exemplary embodiment of the present invention.

FIG. 6 is a perspective view of the library apparatus 100 according to this first exemplary embodiment in the state that the rear magazine 300 is locked at the near side of the chassis 101 as shown in FIG. 5. The control circuit of the accessor mechanism 103 changes location information stored in advance in a memory (not shown) or the like regarding cartridges which are stored in the rear magazine 300 into the location information indicating the cartridges are at the front magazine 200. Because the rear magazine 300 is locked in the state that the slot 106 of the chassis 101 is closed as shown in FIG. 6, it can prevent the user's hand from accidentally entering inside of the chassis 101 during operation of the library apparatus 100. By such structure, the library apparatus 100 can continue to perform extraction, transportation and storage of the cartridges in the rear magazine 300 by the accessor mechanism 103, and to perform writing data to the cartridge in the magnetic tape drive 102 even in the state that the front magazine 200 has been taken out. Accordingly, the library apparatus 100 can avoid from non-working during the replacement of the cartridges in the front magazine 200.

Next, an arrangement when the front magazine 200 is inserted in the chassis 101 will be described.

Figure 7:
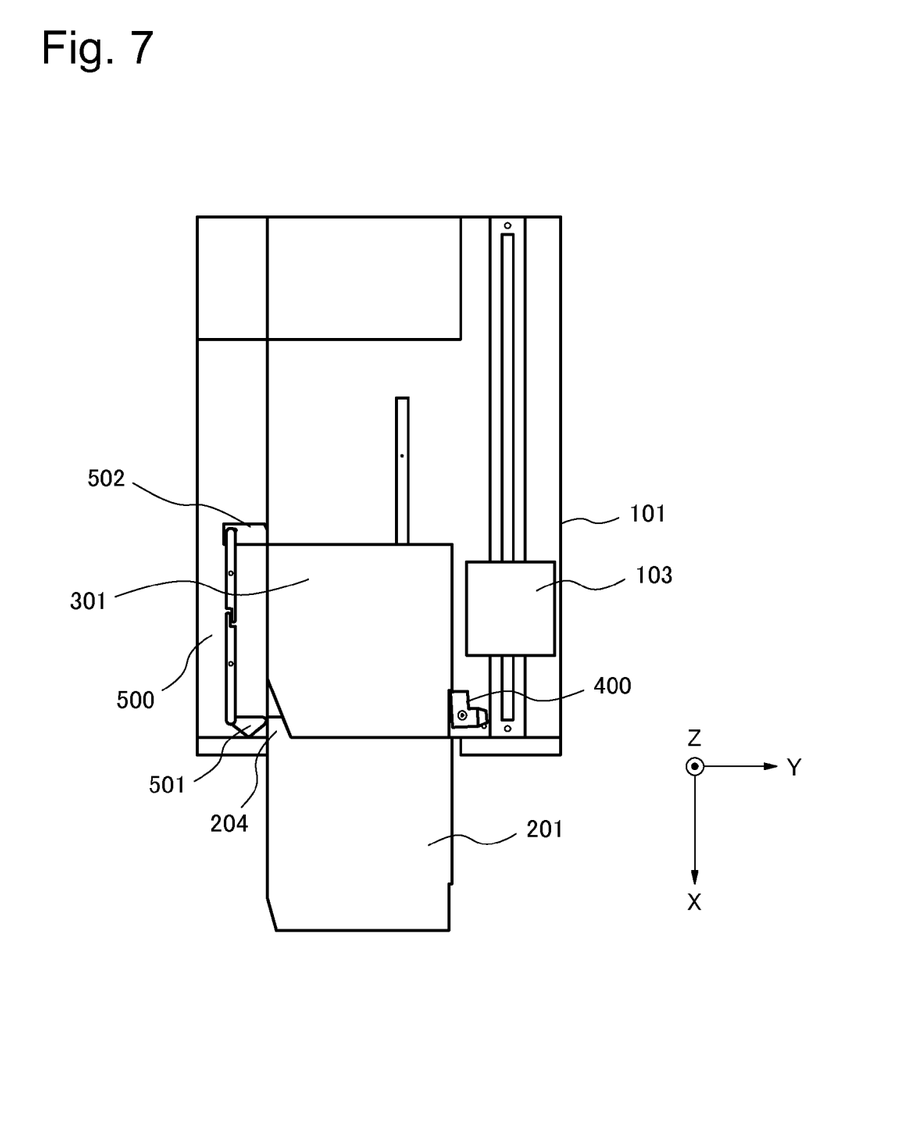
FIG. 7 is a top view of the library apparatus illustrating an placement in which the front magazine is inserted into the chassis according to the first exemplary embodiment of the present invention.

FIG. 7 is a top view illustrating an arrangement of the library apparatus 100 according to this first exemplary embodiment when the front magazine 200 is inserted in the chassis 101. As shown in FIG. 7, in response to the front magazine 200 is inserted, the projection 204 provided in the front magazine bottom plate 201 pushes the locking block 501 to the (−Y) direction. The locking block 502 also moves in the (−Y) direction by the conjunction mechanism of the second locking mechanism 500. As a result, the lock of the rear magazine 300 is released because both the locking block 501 and the locking block 502 move to the positions where they are located not in the path of the front magazine bottom plate 201. Therefore, the rear magazine 300 can be moved in the (−X) direction. Then, by the user pushes the front magazine 200 into the (−X) direction, the rear magazine 300 also moves to the (−X) direction. The rear magazine 300 finally stops in the position shown in FIG. 3. The control circuit of the accessor mechanism 103 turns the location information regarding the rear magazine 300 that has been changed back to normal.

As has been described above, during the time period after the front magazine 200 has been taken out from the chassis 101 and until it has been inserted again, the rear magazine 300 has not been taken out from the chassis 101. Accordingly, information about cartridges in the rear magazine 300 does not need to be updated from the information held in advance by the control circuit of the accessor mechanism 103. The library apparatus usually needs to perform the inventory operation again when the magazine is taken out. In the library apparatus 100 according to this exemplary embodiment, the inventory operation does not need to be performed again about cartridges in the rear magazine 300 because the rear magazine 300 has not been taken out. Therefore, the library apparatus 100 should simply carry out the inventory operation only to the cartridges in the front magazine 200 which are taken out actually. Accordingly, the library apparatus 100 can minimize the time needed for the inventory operation.

As above, according to this first exemplary embodiment, when the front magazine 200 has been drawn out to replace the cartridges in the library apparatus 100, the first locking mechanism 400 that can be rotated about the rotational axis is fitted with the cutout 302 provided on the rear magazine bottom plate 301 of the rear magazine 300. As a result, the first locking mechanism 400 restricts the move of the rear magazine 300 to the (+X) direction.

Also, the library apparatus 100 includes the second locking mechanism 500 equipped with the locking block 501 and the locking block 502 connected with each other. In the second locking mechanism 500, the locking block 501 projects into the concave 303 provided on the rear magazine bottom plate 301, and the locking block 502 contacts with the rear of the rear magazine bottom plate 301. As a result, the second locking mechanism 500 restricts the move of the rear magazine 300 in the (−X) direction.

By aforementioned constitution, the library apparatus 100 does not need to perform the inventory operation regarding the rear magazine 300 because it can restrict the rear magazine 300 be taken out from the chassis 101 during the replacement of the cartridges. The library apparatus 100 can continue its operation without the rear magazine 300 moving during the replacement of the cartridges using the recording media stored in the rear magazine 300 because the library apparatus 100 can restrict the move of the rear magazine 300 not only to the (+X) direction but also to the (−X) direction.

Consequently, an effect in which the non-actual working hours of the library apparatus 100 can be reduced according to the first exemplary embodiment is obtained because the time for inventory operation can be minimized and the operation of the library apparatus 100 can be continued even during the replacement of the cartridges.

Second Exemplary Embodiment

Figure 8:
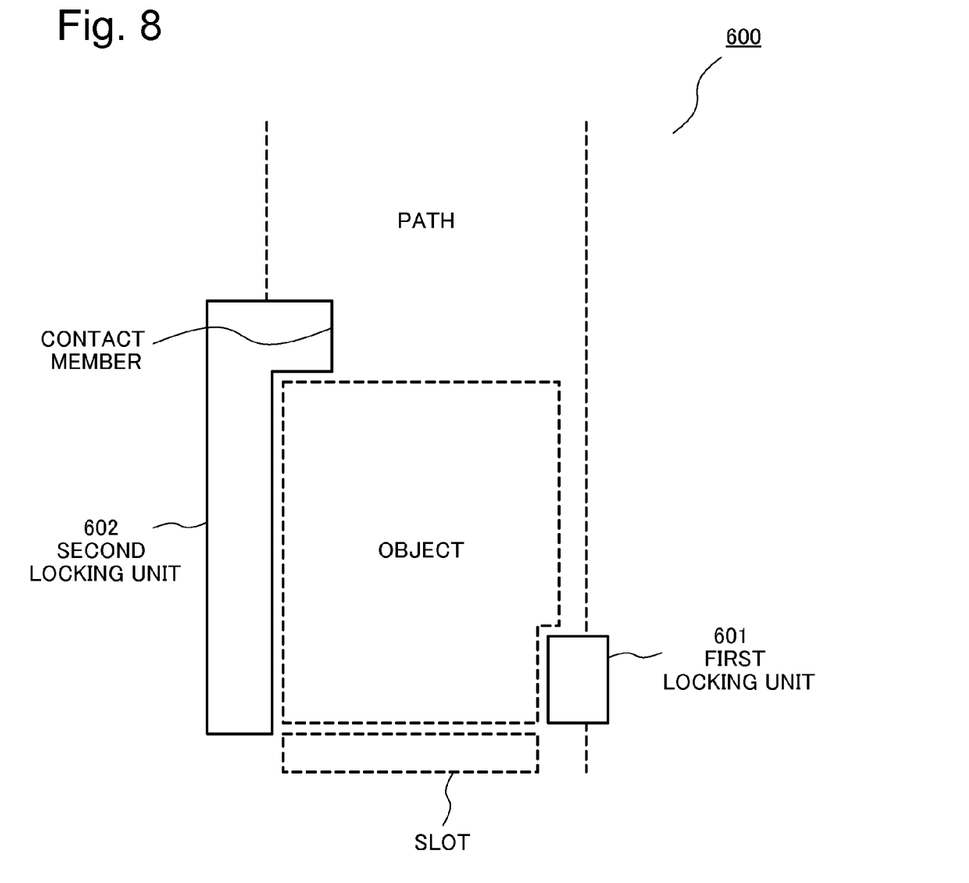
FIG. 8 is a block diagram showing a structure of a locking mechanism according to a second exemplary embodiment of the present invention.

FIG. 8 is a block diagram showing a structure of a locking mechanism 600 according to the second exemplary embodiment of the present invention. As shown in FIG. 8, a locking mechanism 600 includes a first locking unit 601 and a second locking unit 602.

The first locking unit 601 fits with a cutout provided on a side surface of an object to be locked, the object being formed with a plurality of surfaces and the side surface being one of the surfaces in a insertion/extraction direction of the object.

The second locking unit 602 is provided on an opposite side of the first locking unit in a manner sandwiching the object, and includes a contact member being contact with a back surface of the object, the back surface being one of the surfaces and far from a slot to/from which the object is inserted/extracted, wherein at least a part of the contact member being located in a path of the object.

The locking mechanism 600 corresponds to the first locking mechanism 400 and the second locking mechanism 500 in the first exemplary embodiment. Likewise, the first locking unit 601 corresponds to the first locking mechanism 400, the second locking unit 602 corresponds to the second locking mechanism 500, and the contact member corresponds to the locking block 502. The object to be locked corresponds to a magazine likewise.

By aforementioned constitution, an effect in which the non-actual working hours of the library apparatus can be reduced is obtained according to the second exemplary embodiment.

Meanwhile, the shapes of such as the concave 203 of the front magazine bottom plate 201, the concave 303 of the rear magazine bottom plate 301 and the locking blocks 501 and 502 described in each of the above-mentioned exemplary embodiments are not limited to the illustrated shapes.

INDUSTRIAL APPLICABILITY

The present invention can be applied to a magnetic tape library apparatus which uses a magnetic tape as a recording medium, for example. Note that the recording medium is not limited to the magnetic tape, and it may be other media, such as an optical disc, which recordable data treated by an information processing device. A recording medium does not have to be housed in a cartridge.

Although a part or all of the above-mentioned exemplary embodiments can also be described like the following supplementary notes, it is not limited to these.

(Supplementary Note 1)

A locking mechanism including:

a first locking unit which fits with a cutout provided on a side surface of an object to be locked, the object being formed with a plurality of surfaces and the side surface being one of the surfaces in a insertion/extraction direction of the object; and a second locking unit, provided on an opposite side of the first locking unit in a manner sandwiching the object, which includes a contact member being contact with a back surface of the object, the back surface being one of the surfaces and far from a slot to/from which the object is inserted/extracted, wherein at least a part of the contact member being located in a path of the object.

(Supplementary Note 2)

The locking mechanism according to Supplementary note 1, wherein the second locking unit includes a shaft, connected to the contact member, which moves the contact member to be located not in the path of the object.

(Supplementary Note 3)

The locking mechanism according to Supplementary note 2, wherein the shaft includes:

a first shaft which is connected to the contact member at one end; and a second shaft which applies force to the other end of the first shaft different from the end which is connected with the contact member by which the contact member moves to be located not in the path of the object.

(Supplementary Note 4)

The locking mechanism according to Supplementary note 3, wherein the second locking unit further includes a locking member, connected to the other end of the second shaft different from the end which applies the force to the end of the first shaft, at least a part of the locking member being located in the path of the object.

(Supplementary Note 5)

The locking mechanism according to Supplementary note 4, wherein at least a part of the locking member being located at a concave provided on the opposite side surface of the side surface on which the cutout is provided.

(Supplementary Note 6)

The locking mechanism according to Supplementary note 4, wherein, in response to force in an insertion direction of the object, the locking member moves by the force to be located not in the path of the object and the contact member moves to be located not in the path of the object in conjunction with the move of the locking member via the first shaft and the second shaft.

(Supplementary Note 7)

The locking mechanism according to Supplementary note 6, wherein the second shaft rotates in connection with the move of the locking member, and the first shaft moves the contact member to be located not in the path of the object by rotating in conjunction with the rotation of the second shaft.

(Supplementary Note 8)

The locking mechanism according to Supplementary note 3 further including a biasing member which connects the first shaft and the second shaft and applies force by which the contact member connected to the first shaft and the locking member connected to the second shaft push the object.

(Supplementary Note 9)

The locking mechanism according to Supplementary note 1, wherein the first locking unit, being rotatable, fits with the cutout by the rotational force and releases the fit by force against the rotational force.

(Supplementary Note 10)

The locking mechanism according to Supplementary note 9, wherein the first locking unit includes a first piece fitting with the cutout, and a second piece extending in a different direction from the first piece relative to a rotational axis, the second piece rotating around the rotational axis according the force against the rotational force.

(Supplementary Note 11)

A library apparatus, including:

a first object placed in a near side from a slot to/from which the first object is inserted/extracted;

a second object placed in a back side from the slot relative to the first object; and a locking mechanism including a first locking unit which fits with a cutout provided on an outer surface parallel to an insertion/extraction direction of the first object, the first object being formed with a plurality of outer surfaces, and a second locking unit, provided on an opposite side of the first locking unit in a manner sandwiching the first object, which includes a contact member being contacted with a projection provided on a back surface of the first object, wherein the contact member being located not in the path of the first object.

(Supplementary Note 12)

The library apparatus according to Supplementary note 11, wherein the first object and the second object is a magazine storing a recording medium.

(Supplementary Note 13)

The library apparatus according to Supplementary note 11, further including an accessor mechanism which applies force against rotational force of the first locking unit.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

DESCRIPTION OF SYMBOLS 100 library apparatus
101 chassis
102 magnetic tape drive
103 accessor mechanism
104 accessor mechanism guide rail
105 magazine guide rail
106 slot
200 front magazine
201 front magazine bottom plate
202 and 302 cutout
203 and 303 concave
204 projection
300 rear magazine
301 rear magazine bottom plate
400 first locking mechanism
401 locking lever
402 locking rotating shaft
500 second locking mechanism
501 and 502 locking block
503 and 504 locking shaft
505 and 506 locking rotating axis

The invention claimed is:

1. A locking mechanism comprising:
   a first locking unit which fits with a cutout provided on a side surface of an object to be locked, the object being formed with a plurality of surfaces and the side surface being one of the surfaces in a insertion/extraction direction of the object; and
   a second locking unit, provided on an opposite side of the first locking unit in a manner sandwiching the object, which includes a contact member being in contact with a back surface of the object, the back surface being one of the surfaces and far from a slot to/from which the object is inserted/extracted,
   wherein at least a part of the contact member is located in a path of the object,
   wherein the second locking unit includes a shaft, connected to the contact member, which moves the contact member to be located not in the path of the object, and
   wherein the shaft includes:
   a first shaft which is connected to the contact member at one end; and
   a second shaft which applies force to the other end of the first shaft different from the end which is connected with the contact member by which the contact member moves to be located not in the path of the object.

2. The locking mechanism according to claim 1, wherein the second locking unit further includes
   a locking member, connected to the other end of the second shaft different from the end which applies the force to the end of the first shaft, at least a part of the locking member being located in the path of the object.

3. The locking mechanism according to claim 2, wherein at least a part of the locking member being located at a concave provided on the opposite side surface of the side surface on which the cutout is provided.

4. The locking mechanism according to claim 2, wherein, in response to force in an insertion direction of the object, the locking member moves by the force to be located not in the path of the object and the contact member moves to be located not in the path of the object in conjunction with the move of the locking member via the first shaft and the second shaft.

5. The locking mechanism according to claim 4, wherein the second shaft rotates in connection with the move of the locking member, and the first shaft moves the contact member to be located not in the path of the object by rotating in conjunction with the rotation of the second shaft.

6. The locking mechanism according to claim 1 further comprising
   a biasing member which connects the first shaft and the second shaft and applies force by which the contact member connected to the first shaft and the locking member connected to the second shaft push the object.

7. A locking mechanism comprising:
   a first locking unit which fits with a cutout provided on a side surface of an object to be locked, the object being formed with a plurality of surfaces and the side surface being one of the surfaces in a insertion/extraction direction of the object; and
   a second locking unit, provided on an opposite side of the first locking unit in a manner sandwiching the object, which includes a contact member being in contact with a back surface of the object, the back surface being one of the surfaces and far from a slot to/from which the object is inserted/extracted,
   wherein at least a part of the contact member is located in a path of the object,
   wherein the first locking unit, being rotatable, fits with the cutout by the rotational force and releases the fit by force against the rotational force, and
   wherein the first locking unit includes a first piece fitting with the cutout, and a second piece extends in a different direction from the first piece relative to a rotational axis, the second piece rotating around the rotational axis according to the force against the rotational force.

8. A library apparatus, comprising:
   a first object placed in a near side from a slot to/from which the first object is inserted/extracted;
   a second object placed in a back side from the slot relative to the first 10 object; and
   a locking mechanism including
      a first locking unit which fits with a cutout provided on an outer surface parallel to an insertion/extraction direction of the first object, the first object being formed with a plurality of outer surfaces, and
      a second locking unit, provided on an opposite side of the first locking unit in a manner sandwiching the first object, which includes a contact member being contacted with a projection provided on a back surface of the first object,
   wherein the contact member is located not in the path of the first object.

9. The library apparatus according to claim 8, wherein the first object and the second object is a magazine storing a recording medium.

10. The library apparatus according to claim 8, further comprising an accessor mechanism which applies force against rotational force of the first locking unit.

11. The library apparatus according to claim 8, wherein the second locking unit includes a shaft, connected to the contact member, which moves the contact member to be located not in the path of the object, and
    wherein the shaft includes:
    a first shaft which is connected to the contact member at one end; and
    a second shaft which applies force to the other end of the first shaft different from the end which is connected with the contact member by which the contact member moves to be located not in the path of the object.

12. The library apparatus according to claim 11, wherein the second locking unit further includes a locking member, connected to the other end of the second shaft different from the end which applies the force to the end of the first shaft, at least a part of the locking member being located in the path of the object.

13. The library apparatus according to claim 12, wherein at least a part of the locking member being located at a concave provided on the opposite side surface of the side surface on which the cutout is provided.

14. The library apparatus according to claim 12, wherein, in response to force in an insertion direction of the object, the locking member moves by the force to be located not in the path of the object and the contact member moves to be located not in the path of the object in conjunction with the move of the locking member via the first shaft and the second shaft.

15. The library apparatus according to claim 14, wherein the second shaft rotates in connection with the move of the locking member, and the first shaft moves the contact member to be located not in the path of the object by rotating in conjunction with the rotation of the second shaft.

16. The library apparatus according to claim 11 further comprising
- a biasing member which connects the first shaft and the second shaft and applies force by which the contact member connected to the first shaft and the locking member connected to the second shaft push the object.

17. The library apparatus according to claim 8,
- wherein the first locking unit, being rotatable, fits with the cutout by the rotational force and releases the fit by force against the rotational force, and
- wherein the first locking unit includes a first piece fitting with the cutout, and a second piece extends in a different direction from the first piece relative to a rotational axis, the second piece rotating around the rotational axis according to the force against the rotational force.

* * * * *